Feb. 20, 1973  H. TAYLOR ET AL  3,717,399
OPTICAL INTERFERENCE FILTER FOR SHIFTING COLOR TEMPERATURE
Filed March 18, 1971
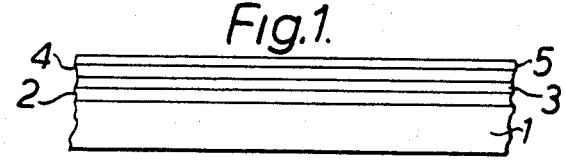
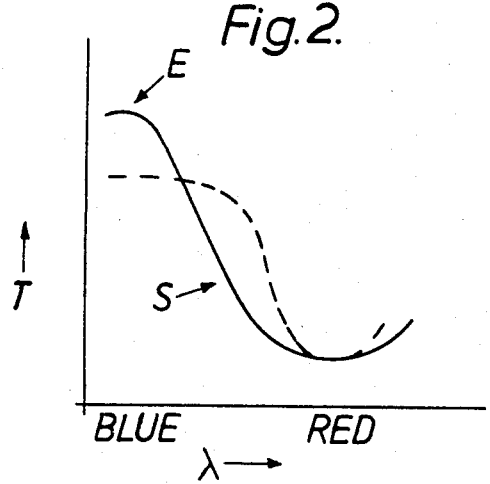
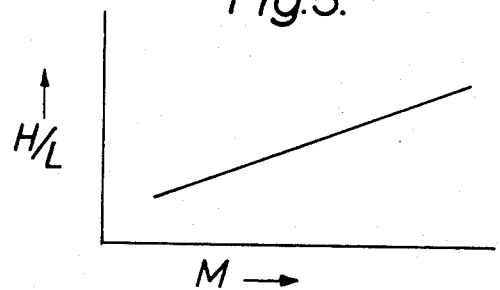
INVENTORS
HYLTON TAYLOR
MICHAEL JOHN TUCK
BY
MATTERN WARE AND DAVIS
ATTORNEYS

United States Patent Office 3,717,399
Patented Feb. 20, 1973

3,717,399
OPTICAL INTERFERENCE FILTER FOR SHIFTING COLOR TEMPERATURE
Hylton Taylor, Denbigh, and Michael John Tuck, Prestatyn, Wales, assignors to Pilkington Perkin-Elmer Limited, Liverpool, England
Filed Mar. 18, 1971, Ser. No. 125,693
Claims priority, application Great Britain, Mar. 20, 1970, 13,475/70
Int. Cl. G02b 1/10, 5/28
U.S. Cl. 350—166                                    7 Claims

ABSTRACT OF THE DISCLOSURE

An optical filter comprises a glass carrier and four layers deposited in superimposed relationship on the carrier, the layers having low and high refractive indices in alternation, and the filter being particularly designed to produce a desired shift in color temperature.

FIELD OF THE INVENTION

This invention relates to an optical filter and finds use in a filter designed to produce a desired shift in color temperature.

BACKGROUND OF THE INVENTION

Conveniently, a shift in colour temperature can be expressed in terms of "mireds." A mired is the reciprocal of color temperature expressed in ° K. multiplied by $10^6$. Thus, a color temperature of 4000° K. is equivalent to 250 mireds and a color temperature of 3000° K. is equivalent to approximately 333 mireds. The shift between these color temperatures is thus 83 mireds. Conveniently, a filter which produces a color temperature shift from a higher color temperature to a lower color temperature is deemed to be a positive filter, i.e. to effect a positive mired shift, whereas a filter which effects a color temperature shift from a lower color temperature to a higher color temperature is deemed to be a negative filter, i.e. to effect a negative mired shift. The mired shift value of a filter can be calculated from its spectral transmission curve using standard methods well known to those skilled in the art.

In various optical systems there is a requirement for a filter capable of effecting a desired color temperature shift. Desirably, such filters should effect as little as possible reduction in the total transmission of light and should effect a smooth transition.

SUMMARY OF THE INVENTION

It is an object of the present invention to provide an improved optical filter capable of effecting color temperature shift, and a method of producing such a filter.

Broadly, according to the present invention there is provided an optical filter comprising a carrier permeable to light, such as glass, and at least four thin layers deposited in superimposed relationship on the carrier, the layers having low and high refractive indices in alternation, where in the layers have thicknesses which accord with a pre-determined thickness ratio such that the curve of transmission T against wavelength λ has at its steep part a desired gradient $dT/d\lambda$ which is less steep than the corresponding gradient provided by layers all of the same quarter wavelength thickness, and such that there is enhanced transmission towards the blue end of the transmission curve relative to that provided by layers all of the same quarter wavelength thickness, and wherein the layers have refractive indices which accord with a pre-determined high/low refractive index ratio such as to effect a desired color temperature shift.

Preferably the filter has four thin layers, and the invention more particularly provides such a filter wherein the thicknesses of the successive layers accord with the following ratio (commencing with the layer adjacent the carrier):

0.28±10% : 0.28±5% : 0.25±10% : 0.30±5%

Preferably the thicknesses of the layers, which are in practice inherently subject to manufacturing tolerances, nominally accord with the ratio (commencing with the layer adjacent the carrier) 0.28:0.28:0.25:0.30.

Said refractive index ratio may be within the range 1.1 to 2.0 and the color temperature shift may be within the range 0 to 230 mireds. Preferably the high refractive index layers are all of the same high refractive index, and the low refractive index layers are all of the same low refractive index. The carrier may be of glass which may have a refractive index of 1.52.

The invention further provides a set of two or more filters as set forth above, wherein every filter in the set has layers of thicknesses which accord with essentially the same thickness ratio, and wherein different filters in the set have layers providing different refractive index ratios so as to effect different color temperature shifts.

The present invention further provides a method of producing an optical filter to effect a desired color temperature shift, in which at least four thin layers are deposited in superimposed relationship on a carrier which is permeable to light, the layers being of low and high refractive indices in alternation, the method comprising determining a thickness ratio for the layers such that the curve of transmission T against wavelength λ has at its steep part a desired gradient $dT/d\lambda$ which is less steep than the corresponding gradient provided by layers all of the same quarter wavelength thickness, and such that there is enhanced transmission towards the blue end of the transmission curve relative to that provided by layers all of the same quarter wavelength thickness, determining a high/low refractive index ratio appropriate to said desired color temperature shift, and depositing layers having thicknesses which accord with said determined thickness ratio and with refractive indices which accord with said determined refractive index ratio. It will be appreciated that any suitable layer thicknesses which accord with said thickness ratio may be selected, and, similarly, any suitable refractive indices which accord with said refractive index ratio may be selected. Preferably, however, the high refractive index layers all have the same high refractive index, and the low refractive index layers all have the same low refractive index.

Preferably the method comprises depositing only four thin layers, and the invention more particularly provides a method of producing an optical filter to effect a desired color temperature shift in which four thin layers are deposited in superimposed relationship on a carrier which is permeable to light, the layers being of low and high refractive indices in alternation, the method comprising determining a high/low refractive index ratio appropriate to said desired color temperature shift, selecting refractive indices for the layers which accord with the determined refractive index ratio, and depositing the layers with the selected refractive indices and with successive thicknesses which accord with the ratio (commencing with the layer adjacent the carrier)

0.28±10% : 0.28±5% : 0.25±10% : 0.30±5% the thickness ratio being such that the curve of transmission T against wavelength λ has at its steep part a desired gradient $dT/d\lambda$ which is less steep than the corresponding gradient provided by layers all of the same quarter wavelength thickness, and such that there is enhanced transmission towards the blue end of the transmission curve relative to that provided by layers all of the same quarter wavelength thickness. Preferably the method comprises depositing layers whose successive thicknesses nominally accord with the ratio (commencing with the layer adjacent the carrier) 0.28:0.28:0.25:0.30.

The invention further comprehends a method of producing a set of two or more filters in accordance with the invention, the method comprising determining a layer thickness ratio common to all the filters of the set, and determining different refractive index ratios for different filters of the set so as to provide filters which effect different color temperature shifts. The invention also comprehends a method of producing a set of two or more filters, each filter of the set having the same plurality of at least four thin layers deposited in superimposed relationship on a light permeable carrier, the layers being of low and high refractive indices in alternation, the method comprising depositing the layers with essentially the same thickness ratio in respect of every filter of the set, but with different high/low refractive index ratios in respect of different filters of the set, thereby to produce filters for effecting different color temperature shifts. More particularly the invention provides such a method for producing a set of two or more filters each having four thin layers deposited in superimposed relationship on a light permeable carrier, which comprises, in respect of every filter of the set, depositing layers having successive thicknesses which nominally accord with the ratio (commencing with the layer adjacent the carrier) 0.28:0.28:0.25:0.30.

BRIEF DESCRIPTION OF THE DRAWINGS

FIG. 1 schematically shows, by way of example, an optical filter in accordance with the invention;

FIG. 2 is an illustrative transmission curve showing transmission T plotted against wavelength $\lambda$; and FIG. 3 is a graph illustrating the relationship between refractive index ratio $H/L$ and color temperature shift in terms of mireds M.

DESCRIPTION OF THE PREFERRED EMBODIMENT

The filter shown in FIG. 1 comprises a substrate or carrier 1 which is permeable to light and on which four thin layers indicated respectively as 2, 3, 4 and 5 are deposited in superimposed relationship. The layers 2 and 4 have the same low refractive index while the layers 3 and 5 have the same high refractive index. The layers thus have low and high refractive indices in alternation, with a low refractive index layer adjacent the carrier. The thicknesses of the layers 2, 3, 4 and 5 are nominally as follows. The layer 2 (i.e. the layer adjacent the carrier) has a thickness of $0.28\lambda$, the layer 3 has the same thickness of $0.28\lambda$, the layer 4 has a thickness of $0.25\lambda$, and the layer 5 has a thickness of $0.30\lambda$, where $\lambda$ is a reference wavelength. In other words, the layers have thicknesses which accord with the ratio 0.28:0.28:0.25:0.30

It will be appreciated that, in practice, the actual thicknesses, and hence the ratio, is necessarily subject to manufacturing tolerances.

The above thickness ratio is determined so that the transmission curve of the filter, i.e. the curve of transmission T against wavelength $\lambda$, has at its steep part a smooth slope whose gradient $dT/d\lambda$ is less steep than the corresponding part of the transmission curve provided by a filter having layers all of the same quarter wavelength thickness (i.e. layers all of thickness $0.25\lambda$), and so that the transmission towards the blue end of the transmission curve is enhanced to a desired level relative to, i.e. is greater than, the corresponding transmission of a filter have layers all of the same quarter wavelength thickness. This is illustrated in FIG. 2 in which the full line represents the transmission curve of a filter whose layers accord with the determined thickness ratio, and the broken line represents the transmission curve of a filter whose layers are all of the same, quarter wavelength, thickness, the steep part of the transmission curves being indicated as S, and the enhanced transmission towards the blue end as E.

The substrate 1 is of glass having a refractive index of 1.52, and the filter is intended for use in air, i.e. so that the upper layer 5 bounds a medium of refractive index 1.0.

With the thickness pattern set forth above, a desired color temperature shift can be effected by selecting an appropriate high/low refractive index ratio for the layers. The relationship between refractive index ratio and mired shift has been found to be essentially linear, as illustrated in FIG. 3. As examples, the following refractive index ratios within the range 1.1 to 2.0 produce negative mired shifts within the range 0 to 230 about as follows.

| Refractive index ratio $H/L$: | Mired shift |
|---|---|
| 1.2 | 13 |
| 1.5 | 100 |
| 1.6 | 130 |
| 1.7 | 160 |
| 1.9 | 200 |

Thus a particular filter can be produced by determining a high/low refractive index ratio appropriate to the color temperature shift which the filter is required to effect, and selecting refractive indices which provide the determined refractive index ratio. For example, it has been found that a negative mired shift of 130 can be effected by a high/low refractive index ratio of 1.63, and this may be provided by selecting refractive indices of 2.25 and 1.38, or alternatively by selecting refractive indices of 2.70 and 1.66 for the high and low refractive index layers respectively. The layers with the selected refractive indices can then be deposited with thicknesses in accordance with the pre-determined thickness ratio set forth above.

Examples of materials for the high refractive index layers are titanium dioxide ($TiO_2$), zinc sulphide (ZnS) and cerium oxide (CeO). Examples of materials for the low refractive index layers are thorium oxy fluoride (ThOF), magnesium fluoride ($MgF_2$) and sodium aluminium fluoride ($NaAlF_2$).

A particular specific example of a filter in accordance with the invention, in which the layer thicknesses are based on a reference wavelength of 0.6250 microns and which effects a negative mired shift (calculated from the filter's spectral transmission curve) of 130, is as follows:

| Layer | Thickness (microns) | Refractive index |
|---|---|---|
| Substrate 1 (glass) | Massive | 1.52 |
| 2 (magnesium fluoride) | 0.175 | 1.38 |
| 3 (oxide of titanium) | 0.175 | 2.25 |
| 4 (magnesium fluoride) | 0.156 | 1.38 |
| 5 (oxide of titanium) | 0.187 | 2.25 |

It will be appreciated that a set or family of filters of the above described form can readily be produced, every filter of the set or family having four thin layers whose thicknesses accord with the same thickness ratio set forth above, but each particular filter of the set having layers providing a particular high/low refractive index ratio appropriate to the particular mired shift to be effected by that filter. In other words, different filters in the set have different high/low refractive index ratios so that they can effect different mired shifts, but all the filters of the set have a common layer thickness ratio. Conveniently the filters in the set may be graduated in accordance with a suitable color temperature shift increment, for example an increment of 500° K., the filters having appropriate high/low refractive index ratios selected to effect the equivalent mired shifts. Since the filters are additive in effect (e.g. a filter which effects a negative mired shift of X can be combined with a filter which effects a negative mired shift of Y to give a combined filter which effects a negative mired shift of $X+Y$), the particular mired shifts of the filters in the set may be suitably selected to optimise the number of different mired shifts which can be effected by selective permutation of filters from a set containing a minimal total number of individual filters.

What is claimed is:

1. An optical filter comprising a carrier permeable to light, and at least four layers deposited in superimposed relationship on the carrier, the layers having low and high refractive indices in alternation, wherein the successive layers have optical thicknesses which accord with the thickness ratio commencing with the layer adjacent to the carrier: $0.28 \mp 10\%$; $0.28 \mp 5\%$; $0.25 \mp 10\%$: $0.30\% \mp 5\%$, such that the curve of transmission T against wavelength $\lambda$ has at its steep part a desired gardient $dT/d\lambda$ which is less steep than the corresponding gradient provided by layers all of the same quarter wavelength optical thickness, and such that there is enhanced transmission towards the blue end of the transmission curve relative to transmission provided by layers all of the same quarter wavelength optical thickness, and wherein the layers have refractive indices which accord with a predetermined high/low refractive index ratio such as to effect a desired color temperature shift.

2. An optical filter according to claim 1 wherein the optical thicknesses of the successive layers substantially accord with the following ratio (commencing with the layer adjacent the carrier): 0.28:0.28:0.25:0.30.

3. An optical filter according to claim 1 wherein the high/low refractive index ratio is within the range of substantially 1.1 to 2.0.

4. An optical filter according to claim 1 wherein the color temperature shift is within the range of about 0 to 230 mireds.

5. An optical filter according to claim 1 wherein the high refractive index layers are all of the same high refractive index and the low refractive index layers are all of the same low refractive index.

6. An optical filter according to claim 1 wherein the carrier is glass having a refractive index of about 1.52.

7. A set of two or more filters according to claim 1 wherein every filter in the set has layers of thicknesses which accord with substantially the same thickness ratio and wherein different filters in the set have layers providing different refractive index ratios so as to effect different color temperature shifts.

References Cited

UNITED STATES PATENTS 3,528,725    9/1970    Barkley _____ 350—166

OTHER REFERENCES

Baumeister, P. W.: Handbook of Optical Design, Mil. HDBK. 140, pp. 20–51 to 20–55 and 20–57.

DAVID SCHONBERG, Primary Examiner

R. J. STERN, Assistant Examiner 106-005

UNITED STATES PATENT OFFICE
CERTIFICATE OF CORRECTION

Patent No. 3,717,399　　　　　　　　Dated　　February 26, 1973

Inventor(s) Hylton Taylor and Michael John Tuck

It is certified that error appears in the above-identified patent and that said Letters Patent are hereby corrected as shown below:

Column 1, line 61, "where in" should read -- wherein --

Column 5, line 17, "0.30% $\mp$ 5%" should read -- 0.30 $\mp$ 5% --

Column 5, line 19, "gardient" should read -- gradient --

Signed and sealed this 3rd day of July 1973.

(SEAL)
Attest:

EDWARD M. FLETCHER, JR.　　　　　Rene Tegtmeyer
Attesting Officer　　　　　　　　　Acting Commissioner of Patents